Oct. 31, 1939.  H. SCHMIDT  2,178,496
PROCESS FOR THE PRODUCTION OF HIGHLY CONCENTRATED
HYDROGEN PEROXIDE SOLUTIONS
Filed May 28, 1938
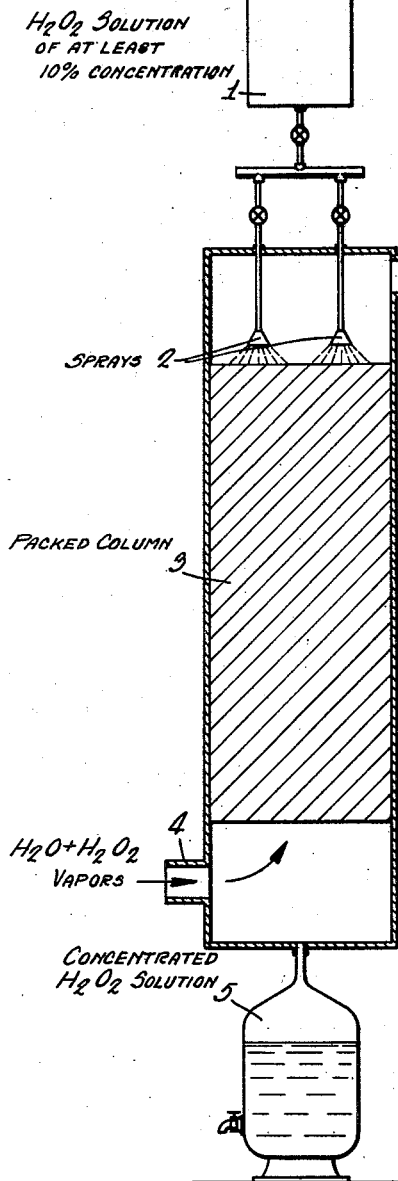
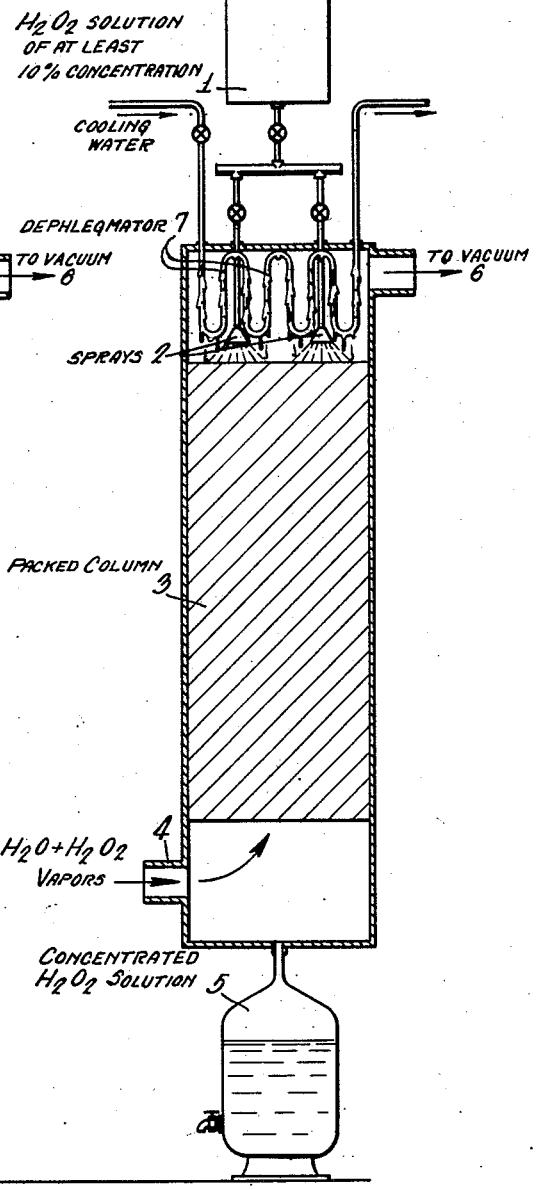
Inventor:—
Heinrich Schmidt
by his Attorneys
Howson & Howson Patented Oct. 31, 1939

2,178,496

UNITED STATES PATENT OFFICE 2,178,496

PROCESS FOR THE PRODUCTION OF HIGHLY CONCENTRATED HYDROGEN PEROXIDE SOLUTIONS

Heinrich Schmidt, Waldorf, Germany, assignor to The Pennsylvania Salt Manufacturing Company, Philadelphia, Pa., a corporation of Pennsylvania Application May 28, 1938, Serial No. 210,747
In Germany October 12, 1937

14 Claims. (Cl. 202—52)

My invention relates to a process for the production of highly concentrated solutions of hydrogen peroxide, and more particularly it relates to the production of highly concentrated solutions directly from mixtures of water vapor and hydrogen peroxide vapor, for example, the vapors resulting from the distillation of solutions of percompounds, such as persulphuric acid or persulphates, or of solutions of hydrogen peroxide.

The principal object of the present invention is to provide a simple and economical process for the production of highly concentrated aqueous solutions of hydrogen peroxide, for example, solutions above the usual 30% strength, including solutions of a concentration of 45% to 60% or higher.

Another object of the invention is to provide a method of producing concentrated hydrogen peroxide solutions of the type described directly from the mixture of water and hydrogen peroxide vapors liberated from persulphuric acid and persulphate solutions during the vacuum distillation thereof.

Other objects will be apparent from a consideration of the specification and claims.

In the accompanying drawing, Figure 1 is a diagrammatic illustration of one form of apparatus for carrying out the process of the present invention; and Fig. 2 is a similar view of a modification thereof.

It has been very difficult to produce on a commercial scale highly concentrated solutions of hydrogen peroxide directly from mixtures of water vapor and peroxide vapor in which the peroxide concentration is of low percentage, as for instance, the vapors resulting from the vacuum distillation of persulphuric acid and persulphate solutions. Fractional condensation using dephlegmators requires the use of relatively large cooling surfaces and the maintenance of temperatures within narrow limits. Furthermore, it has not been possible to obtain highly concentrated peroxide solutions, for example 45% to 60% hydrogen peroxide from all of the vapors produced by the distillation equipment without a second distillation of a portion of the condensed product.

The process of the present invention contemplates passing a mixture of water vapor and hydrogen peroxide vapor in contact with an aqueous solution of hydrogen peroxide of a concentration of at least 10% either in co-flow or counter-flow relationship, preferably the latter. Preferably, the vapors brought into contact with the hydrogen peroxide solution are liberated during the vacuum distillation of solutions yielding hydrogen peroxide upon heating, such as the solution of persulphuric acid and persulphates (included herein within the term "persulphate") generally used for this purpose or a solution of hydrogen peroxide being redistilled. The solution advantageously is admitted at the top of a column or condenser of any desired design and construction. Intimate contact between the hydrogen peroxide solution and the vapors is preferably brought about by spraying or atomizing the solution or by using one of the well-known flooded systems, for example, a column packed with suitably placed Raschig rings. The process may be carried out in the treatment of vapors of any peroxide content.

The process may be conducted in the column or condenser to which the vapors of water and hydrogen peroxide from the distillation apparatus are admitted adjacent the bottom thereof, and the vapors may be substantially freed of hydrogen peroxide in this single treatment so that only one column or condenser is required. It is to be understood, however, that the process is applicable for use in any of the condensers where a series of condensers are employed such as are used in fractional condensation. The process may be carried out without the use of a dephlegmator in the column or condenser, or other cooled surfaces, but it is often advantageous to supplement the treatment of the vapors with the hydrogen peroxide solution by fractional condensation, using the ordinary type of dephlegmator. In this way, the process is more effective when applied to more highly superheated vapors under a high vacuum.

The concentration of the hydrogen peroxide solution obtained as the result of the process will be determined by the concentration, temperature, and quantity of the hydrogen peroxide solution used in the process, the temperature and concentration of the vapors, the degree of vacuum in the column, and the degree of fractional condensation afforded by the dephlegmator, if one is used. It is, therefore, possible to select conditions to obtain a solution of the concentration desired. The conditions employed in any particular instance are such that at least a portion of the hydrogen peroxide vapor is condensed while at least a portion of the water vapor remains uncondensed. Preferably, the conditions are chosen so that a major portion or substantially all of the hydrogen peroxide vapor is condensed but the major portion of the water vapor remains uncondensed. It is also desirable to establish conditions within the column so that a portion of the water contained in the hydrogen peroxide solution admitted to the column is evaporated, thereby resulting in the production of a more concentrated solution. It will be understood, therefore, that the conditions in the column may be such that not only is there fractional condensation of the mixture of vapors favoring the condensation of hydrogen peroxide, but also fractional evaporation of the hydrogen peroxide solution, causing a concentration of the hydrogen peroxide content thereof by the evaporation of water. Usually the concentration of the solution of hydrogen peroxide used in the process will be between 10% and 40%, generally between 15% and 30%. Advantageously, hydrogen peroxide stabilizers are dissolved in the solution in amounts in the neighborhood of .01% to .1% by weight. Examples of stabilizers applicable for use are phosphoric, barbituric or uric acid or mixtures thereof.

The hydrogen peroxide solution brought in contact with the vapors acts to supplement or replace the action of the dephlegmators used in fractional condensation, since the temperature and quantity of the solution added may be chosen so that condensation of the hydrogen peroxide is favored while the major portion of the water vapor is not condensed and leaves the column or condenser in vapor form. Hence, depending on the conditions existing in the column or condenser, the temperature of the solution added to the column or condenser may vary widely, for example, from 5° C. to 40° C. or 50° C., it being understood that, in general, the use of a large amount of solution at a high temperature gives the same results as a smaller amount at a lower temperature.

The concentrated solution of hydrogen peroxide which may be as high as 45% to 60% or even higher, if desired, is removed adjacent the bottom of the column or condenser while the uncondensed vapors are removed adjacent the top thereof.

In Figure 1, there is diagrammatically shown one form of apparatus for carrying out the process of the present invention wherein the hydrogen peroxide solution of at least 10% concentration is stored in tank 1 and is supplied to sprays 2 through suitable connections. The sprays 2 are placed as shown in packed column 3 to which the hydrogen peroxide and water vapors are admitted adjacent the bottom thereof at 4. The system is maintained under a vacuum, and the uncondensed vapors are removed from the column at 6. The condensed concentrated hydrogen peroxide solution is collected in container 5. Figure 2 shows the same type of apparatus as that illustrated in Figure 1 with the exception that in Figure 2 the use of a dephlegmator is shown at 7.

In the following example, the prior practice is contrasted to the process of the invention. The example is submitted as illustrative of the process, and is not to limit the scope of the invention.

In the distillation of 1000 litres of a persulphate solution containing 30% $H_2O_2$, when the persulphate content is calculated as peroxide, in a packed tower fitted with a dephlegmator providing fractional condensation, 85 kilograms of 30% hydrogen peroxide are obtained when a vacuum of 25 millimetres of mercury and an inlet temperature of the vapor of 70° C. are employed. The water vapor which is condensed separately contains 0.2 kilogram of hydrogen peroxide. The distillation yield is 85% when calculated as 30% hydrogen peroxide.

On the other hand, if 1000 litres of a like solution are distilled in the same manner, but the cooling by the dephlegmator is so altered that only about 35% of the heat extraction is caused through cooling, and if at the same time 80 kilograms of a 25% solution of hydrogen peroxide at room temperature are sprayed into the upper part of the tower during the time of the distillation and counter-current to the path of the vapor, there results 86.5 kilograms of 54% $H_2O_2$. The condensed water contains only 0.002 kilogram $H_2O_2$ and the distillation yield is about 87%.

Considerable modification is possible in the process as described herein without departing from the essential features thereof, as set forth in the claims hereof.

I claim:

1. The process of producing a concentrated solution of hydrogen peroxide which comprises bringing into intimate contact a mixture of water and hydrogen peroxide vapors and an aqueous solution of hydrogen peroxide, containing at least 10% $H_2O_2$, under conditions causing by said intimate contact the condensation of at least a portion of the hydrogen peroxide vapor while at least a portion of the water vapor remains uncondensed, and thereafter separating the solution from the uncondensed vapor.

2. The process of claim 1 wherein the aqueous solution of hydrogen peroxide contains a hydrogen peroxide stabilizer.

3. The process of claim 1 wherein the mixture of water and hydrogen peroxide vapors, and the aqueous solution of hydrogen peroxide are brought into intimate contact in countercurrent flow.

4. The process of claim 1 wherein the concentration of $H_2O_2$ in the aqueous solution of hydrogen peroxide is between 15% and 30%.

5. The process of claim 1 wherein the major portion of the hydrogen peroxide vapor is condensed while the major portion of the water vapor remains uncondensed, and wherein there is an evaporation of water from the solution of hydrogen peroxide brought into contact with the mixture of vapors.

6. The process of claim 1 wherein the mixture of water and hydrogen peroxide vapors are brought into intimate contact with the solution of hydrogen peroxide, under a vacuum.

7. The process of claim 1 wherein a portion of said mixtures of vapors is condensed by cooling the vapors by means of contact with cooled surfaces and wherein at least a portion of the condensed mixture is brought into contact with a mixture of said vapors.

8. The process of producing a concentrated solution of hydrogen peroxide which comprises passing a mixture of water and hydrogen peroxide vapors upwardly through a column maintained under vacuum, passing an aqueous solution of hydrogen peroxide containing at least 10% hydrogen peroxide downwardly through said column in intimate contact with said mixture of vapors, establishing suitable conditions within said column to condense by said intimate contact at least a portion of the hydrogen peroxide vapor while leaving at least a portion of the water vapor uncondensed, removing the solution adjacent the bottom of said column, and removing the uncondensed vapor adjacent the top thereof.

9. The process of claim 8 wherein the aqueous solution of hydrogen peroxide contains a hydrogen peroxide stabilizer.

10. The process of claim 8 wherein the major portion of the hydrogen peroxide vapor is condensed while the major portion of the water vapor remains uncondensed.

11. The process of claim 8 wherein the major portion of the hydrogen peroxide vapor is condensed while the major portion of the water vapor remains uncondensed and wherein there is an evaporation of water from the solution admitted to the column.

12. The process of claim 8 wherein the concentration of $H_2O_2$ in the aqueous solution of hydrogen peroxide is between 15% and 30%.

13. The process of claim 8 wherein the mixture of water and hydrogen peroxide vapors are the vapors evolved from the distillation of a persulphate solution.

14. The process of claim 8 wherein a portion of said mixtures of vapors is condensed by cooling the vapors by means of contact with cooled surfaces and wherein at least a portion of the condensed mixture is brought into contact with a mixture of said vapors.

HEINRICH SCHMIDT.